(12) United States Patent
Naous et al.

(10) Patent No.: US 10,466,866 B2
(45) Date of Patent: Nov. 5, 2019

(54) DISPLAYING A COMPLEX SERVICE TOPOLOGY FOR MONITORING

(71) Applicant: AppDynamics LLC, San Francisco, CA (US)

(72) Inventors: Jad Naous, San Francisco, CA (US); Steven Yuan, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 15/338,447

(22) Filed: Oct. 31, 2016

(65) Prior Publication Data
US 2018/0121032 A1 May 3, 2018

(51) Int. Cl.
*G06F 17/00* (2019.01)
*G06F 3/0482* (2013.01)
*H04L 12/24* (2006.01)
*H04L 12/26* (2006.01)

(52) U.S. Cl.
CPC .......... *G06F 3/0482* (2013.01); *H04L 41/046* (2013.01); *H04L 41/12* (2013.01); *H04L 41/22* (2013.01); *H04L 43/045* (2013.01); *H04L 41/5019* (2013.01); *H04L 43/08* (2013.01); *H04L 43/16* (2013.01)

(58) Field of Classification Search
CPC ..... H04L 41/12; H04L 43/045; H04L 41/046; G06F 3/0482
USPC ................................................. 715/273, 734
See application file for complete search history.

(56) References Cited

U.S. PATENT DOCUMENTS

| | | | | |
|---|---|---|---|---|
| 5,793,974 A | * | 8/1998 | Messinger | .............. H04L 41/22 709/223 |
| 5,966,128 A | * | 10/1999 | Savage | ................. H04L 41/044 345/428 |
| 6,144,962 A | * | 11/2000 | Weinberg | ................ G06F 11/32 |
| 7,903,596 B2 | * | 3/2011 | Dobrowski | ............. H04L 41/12 370/311 |

(Continued)

OTHER PUBLICATIONS

Holten, Hierarchical Edge Bundles: Visualization of Adjacency Relations in Hierarchical Data, IEEE 2006, pp. 741-748. (Year: 2006).*

(Continued)

*Primary Examiner* — Cong-Lac Huynh
(74) *Attorney, Agent, or Firm* — Behmke Innovation Group LLC; James Behmke; Stephen D. LeBarron

(57) ABSTRACT

In one aspect, a system for displaying a visual topology of a monitored distributed system is disclosed. The system includes a processor; a memory; and one or more modules stored in the memory and executable by a processor to perform operations including: receive data associated with a monitored application performed over a distributed system of interconnected nodes of machines; identify nodes of interest and one or more chains of nodes connected to the nodes of interest from the interconnected nodes based on the received data; generate an interactive flow map of the interconnected nodes in the distributed system; provide a user interface for displaying the interactive flow map; and automatically display the interactive flow map through the provided user interface to visually distinguish the identified nodes of interest and the one or more chains of nodes connected to the nodes of interest from rest of the interconnected nodes.

22 Claims, 12 Drawing Sheets

(56) References Cited

U.S. PATENT DOCUMENTS

| | | | |
|---|---|---|---|
| 9,740,368 B1* | 8/2017 | Love | G06F 3/04817 |
| 2004/0156321 A1* | 8/2004 | Michael Walker | H04L 41/12 370/254 |
| 2006/0267802 A1* | 11/2006 | Judge | H04L 41/12 340/995.1 |
| 2012/0123815 A1* | 5/2012 | Peterson | G06Q 10/063 705/7.11 |
| 2012/0278321 A1* | 11/2012 | Traub | G06F 17/30657 707/736 |
| 2014/0195277 A1* | 7/2014 | Kim | G06Q 10/02 705/5 |
| 2014/0222983 A1* | 8/2014 | Dasgupta | H04L 43/10 709/223 |
| 2014/0245163 A1* | 8/2014 | Mubarek | G06F 3/0484 715/738 |
| 2015/0235390 A1* | 8/2015 | Jones | G06T 11/20 345/440 |
| 2015/0363081 A1* | 12/2015 | Dai | G06F 3/04845 715/765 |
| 2016/0048556 A1* | 2/2016 | Kelly | G06F 16/9535 707/767 |
| 2016/0110421 A1* | 4/2016 | Galle | G06F 17/30557 707/769 |
| 2016/0219078 A1* | 7/2016 | Porras | G06F 3/0484 |
| 2017/0373923 A1* | 12/2017 | Kazachkov | H04L 41/046 |
| 2018/0123919 A1* | 5/2018 | Naous | H04L 41/12 |
| 2018/0123921 A1* | 5/2018 | O'Connell | H04L 43/067 |
| 2018/0182137 A1* | 6/2018 | Pushpoth | G06T 11/206 |

OTHER PUBLICATIONS

Kelly et al., MoireGraphs: Radial Focus+Context Visualization and Interaction for Graphs with Visual Nodes, IEEE 2003, pp. 1-8. (Year: 2003).*

Karonis et al., Exploiting Hierarchy in Parallel Computer Networks to Optimize Collective Operation Performance, IEEE 2000, pp. 1-8. (Year: 2000).*

* cited by examiner

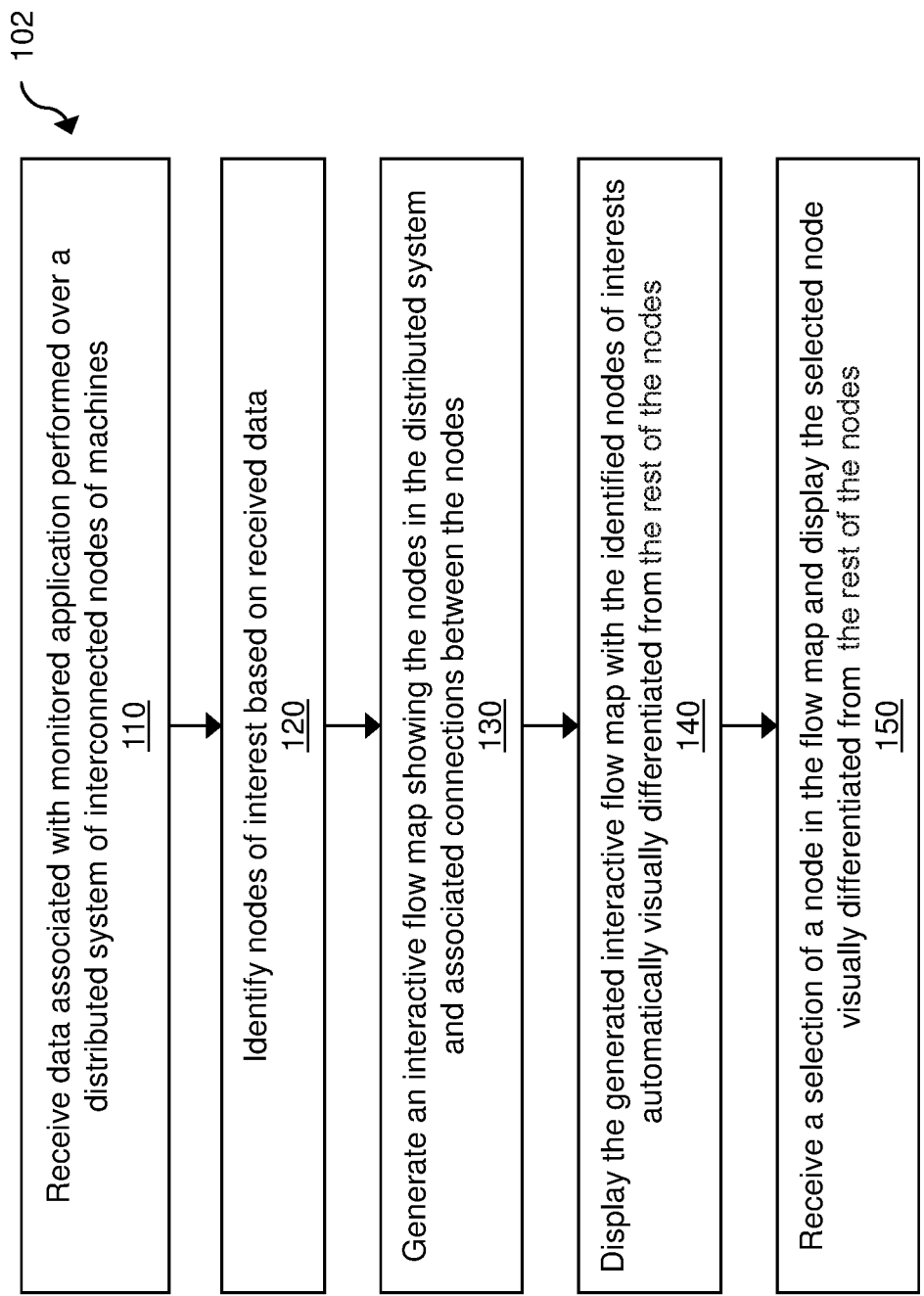

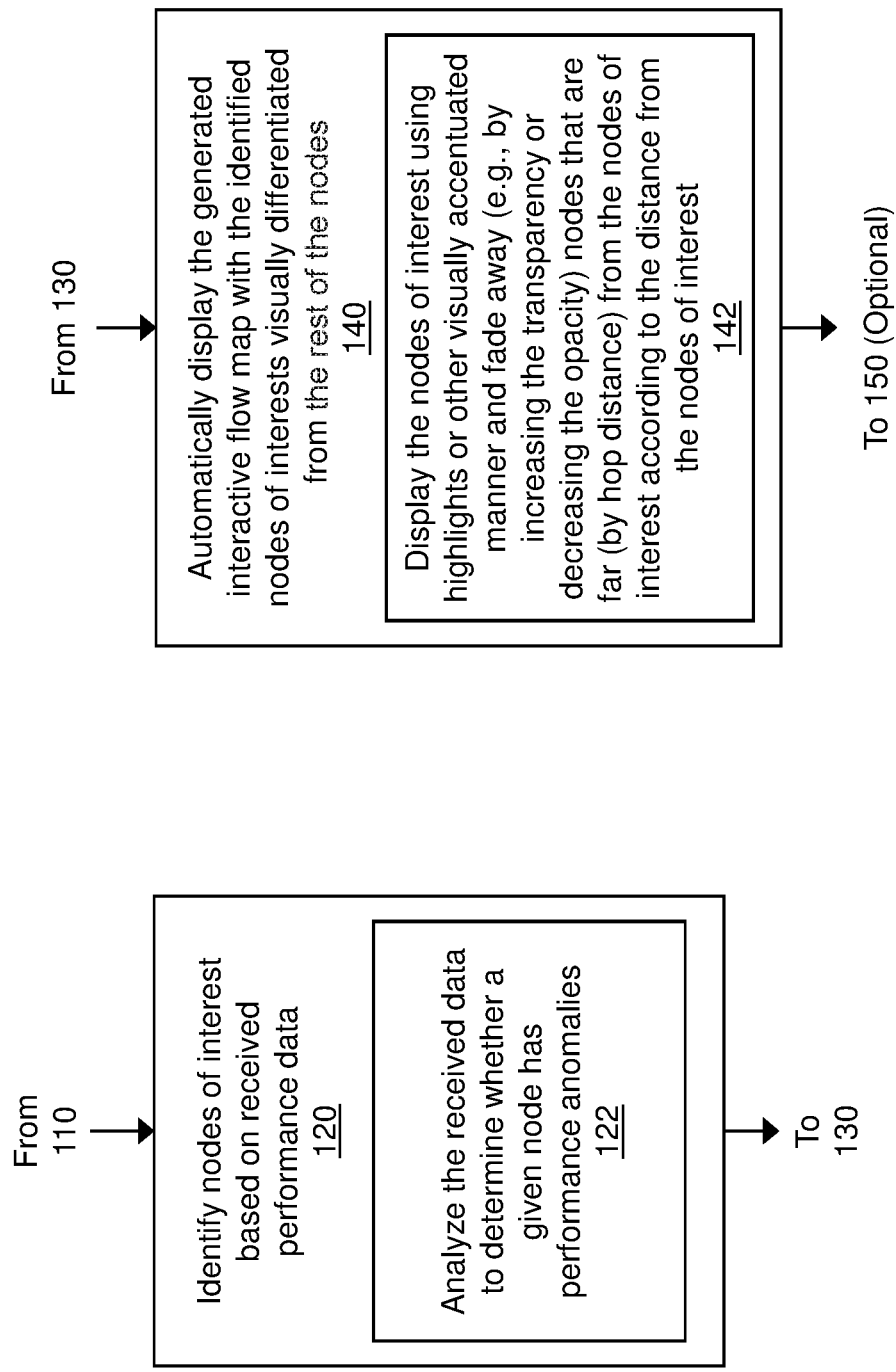

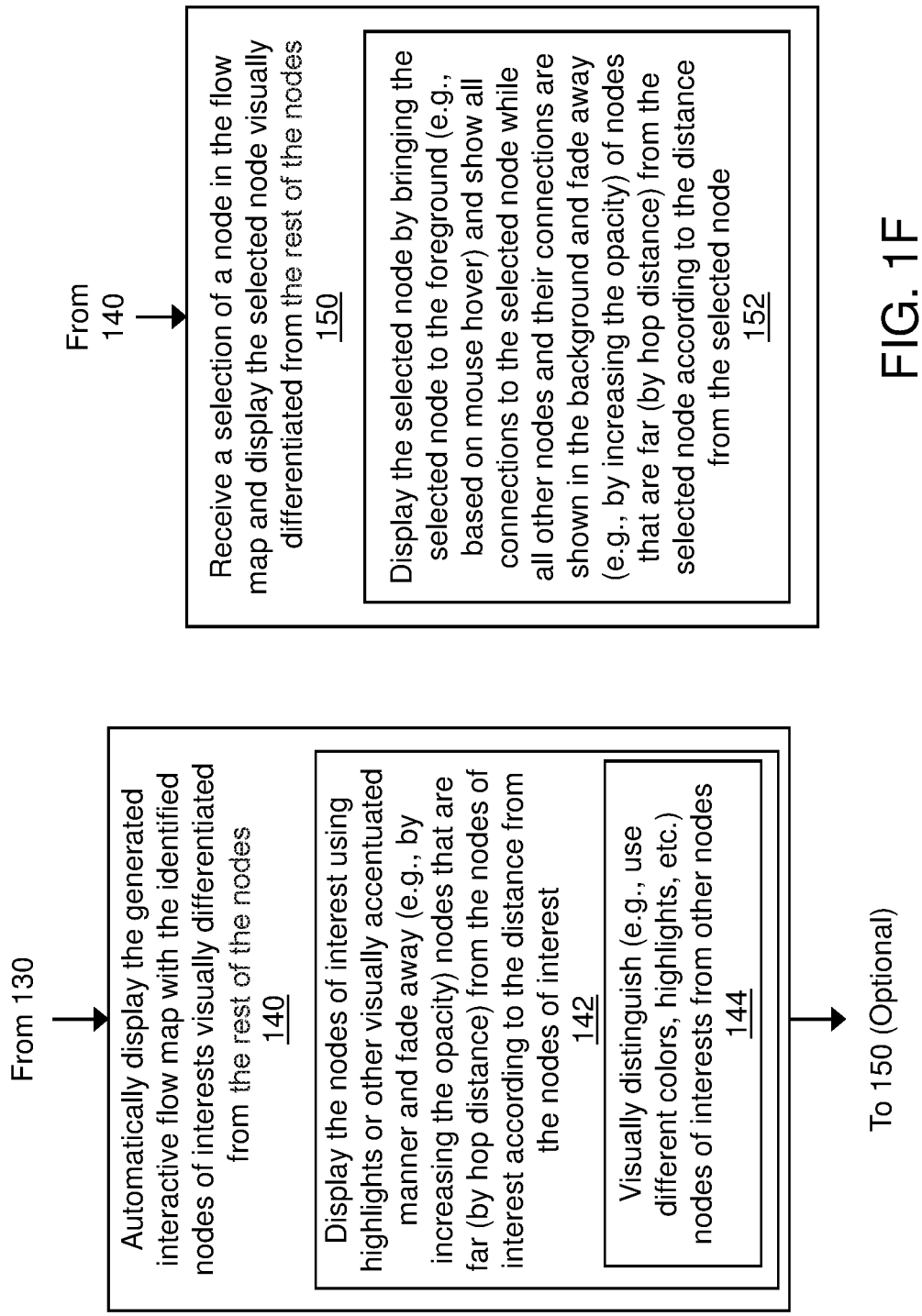

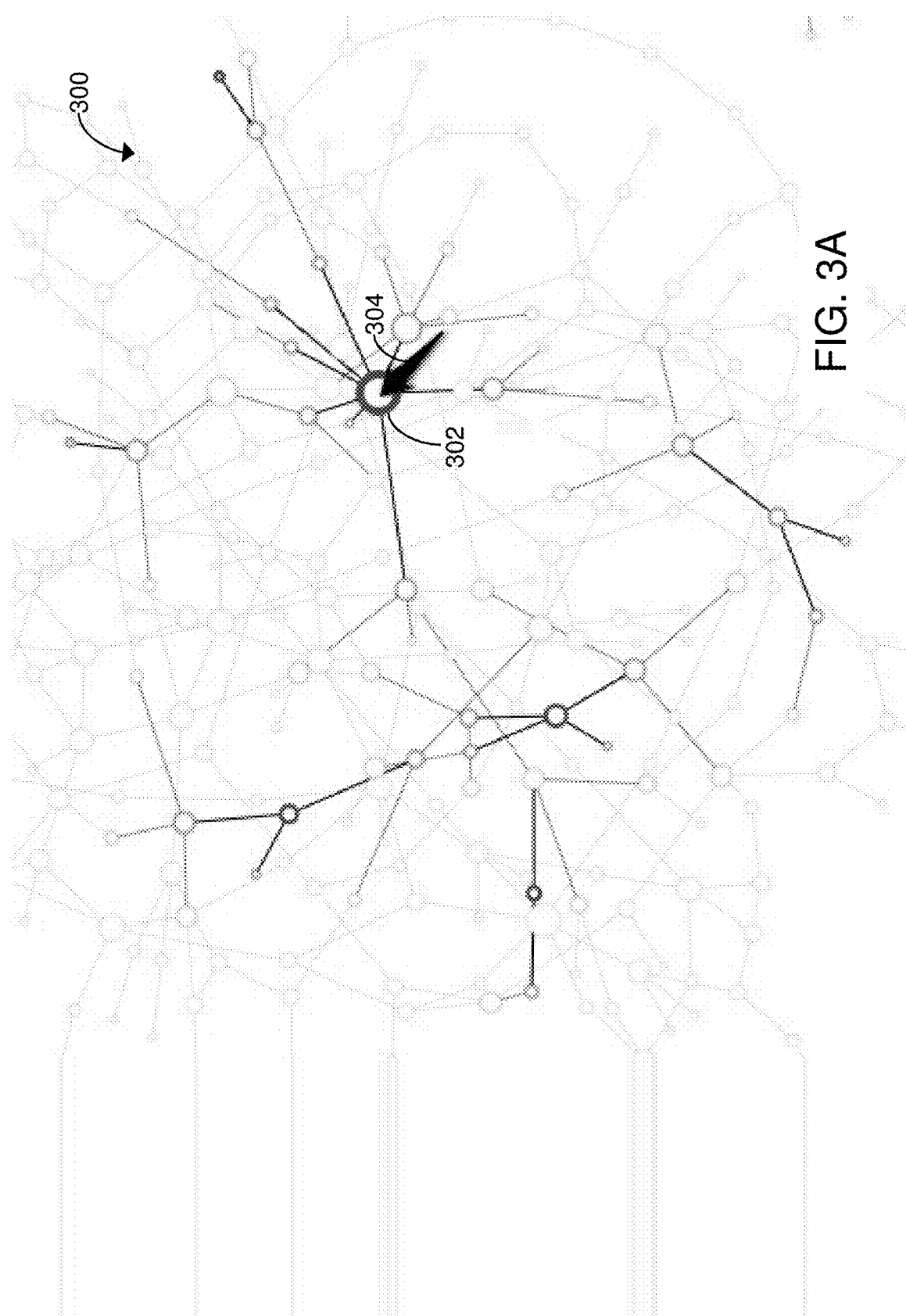

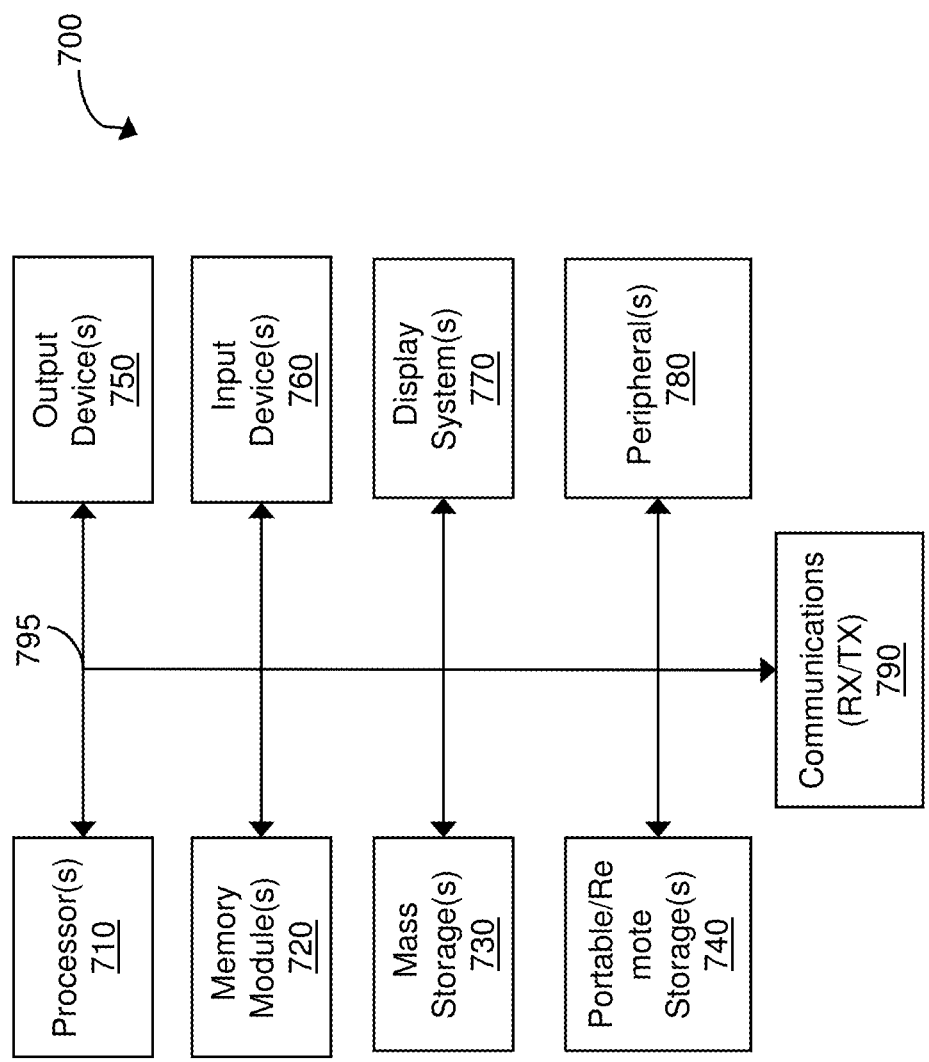

DISPLAYING A COMPLEX SERVICE TOPOLOGY FOR MONITORING

BACKGROUND

In pursuit of the highest level of service performance and user experience, companies around the world are engaging in digital transformation by enhancing investments in digital technology and information technology (IT) services. By leveraging the global system of interconnected computer networks afforded by the Internet and the World Wide Web, companies are able to provide ever increasing web services to their clients. The web services may be provided by a web application which uses multiple services and applications to handle a given transaction. The applications may be distributed over several interconnected machines, such as servers, making the topology of the machines that provide the service more difficult to track and monitor.

SUMMARY

Examples of implementations of displaying a complex service topology for monitoring is disclosed.

In one aspect, a system for displaying a visual topology of a monitored distributed system is disclosed. The system includes a processor; a memory; and one or more modules stored in the memory and executable by a processor to perform operations. The operations performed include: receive performance data associated with a monitored application performed over a distributed system of interconnected nodes of machines; identify nodes of interest and one or more chains of nodes connected to the nodes of interest from the interconnected nodes based on the received performance data; generate an interactive flow map of the interconnected nodes in the distributed system; provide a user interface for displaying the interactive flow map; and automatically display the interactive flow map through the provided user interface to visually distinguish the identified nodes of interest and the one or more chains of nodes connected to the nodes of interest from rest of the interconnected nodes in the interactive flow map, wherein the one or more chains of nodes connected to the nodes of interest are displayed to visually indicate a hop distance of each node in the one or more chains from the connected nodes of interest.

The system can be implemented in various ways to implement one or more of the following features. The one or more modules are executable to display the one or more chains of nodes connected to the nodes of interest to visually indicate the hop distance of each node in the one or more chains from the connected nodes of interest including: display each node in the one or more chains to visually fade away from the nodes of interest at a level associated with the hop distance of each node away from the nodes of interest, wherein the level of fading increases with an increase in the hop distance. The hop distance can include a number of hops away from the nodes of interest. The one or more modules are executable to visually distinguish the identified nodes of interest and the one or more chains of nodes connected to the nodes of interest from rest of the interconnected nodes in the interactive flow map including: vary a color, a size, a thickness of a line, a level of opaqueness or transparency, or a combination of a visual representation of the identified nodes of interest, the one or more chains of nodes connected to the nodes of interest, and connections between the nodes in the one or more chains of nodes.

The one or more modules are executable to visually distinguish the identified nodes of interest and the one or more chains of nodes connected to the nodes of interest from rest of the interconnected nodes in the interactive flow map including: display the identified nodes of interest and the one or more chains of nodes connected to the nodes of interest in the foreground and rest of the interconnected nodes in the background. The identified nodes of interest can include nodes identified to have performance issues based on the received performance data. The one or more modules are executable to receive user input through the user interface that indicate a selection of one of the interconnected nodes in the flow map; identify one or more chains of nodes connected to the selected node; and display the selected node and the identified one or more chains of nodes connected to the selected node to visually distinguish from rest of the interconnected nodes in the flow map. The one or more modules are executable to display the selected node and the identified one or more chains of nodes connected to the selected node to visually distinguish from rest of the interconnected nodes in the flow map including: display the selected node and the identified one or more chains of nodes connected to the selected node in the foreground and rest of the interconnected nodes in the background. The one or more modules are executable to display the selected node and the identified one or more chains of nodes connected to the selected node to visually distinguish from rest of the interconnected nodes in the flow map including: display each node in the one or more chains of nodes connected to the selected node to visually fade away from the selected node at a level associated with a hop distance of each node away from the nodes of interest, wherein the level of fading increases with an increase in the hop distance.

In another aspect, a method for displaying a visual topology of a monitored distributed system is disclosed. The method includes receiving performance data associated with a monitored application performed over a distributed system of interconnected nodes of machines; identifying nodes of interest and one or more chains of nodes connected to the nodes of interest from the interconnected nodes based on the received performance data; generating an interactive flow map of the interconnected nodes in the distributed system; providing a user interface for displaying the interactive flow map; and automatically displaying the interactive flow map through the provided user interface to visually distinguish the identified nodes of interest and the one or more chains of nodes connected to the nodes of interest from rest of the interconnected nodes in the interactive flow map, wherein the one or more chains of nodes connected to the nodes of interest are displayed to visually indicate a hop distance of each node in the one or more chains from the connected nodes of interest.

The method can be implemented in various ways to include one or more of the following features. Displaying the one or more chains of nodes connected to the nodes of interest to visually indicate the hop distance of each node in the one or more chains from the connected nodes of interest can include: displaying each node in the one or more chains to visually fade away from the nodes of interest at a level associated with the hop distance of each node away from the nodes of interest, wherein the level of fading increases with an increase in the hop distance. The hop distance can include a number of hops away from the nodes of interest. Visually distinguishing the identified nodes of interest and the one or more chains of nodes connected to the nodes of interest from rest of the interconnected nodes in the interactive flow map can include: varying a color, a size, a thickness of a line, a level of opaqueness or transparency, or a combination of a visual representation of the identified nodes of interest, the one or more chains of nodes connected to the nodes of interest, and connections between the nodes in the one or more chains of nodes.

Visually distinguishing the identified nodes of interest and the one or more chains of nodes connected to the nodes of interest from rest of the interconnected nodes in the interactive flow map include: displaying the identified nodes of interest and the one or more chains of nodes connected to the nodes of interest in the foreground and rest of the interconnected nodes in the background. The identified nodes of interest can include nodes identified to have performance issues based on the received performance data. The method can include receiving user input through the user interface that indicate a selection of one of the interconnected nodes in the flow map; identifying one or more chains of nodes connected to the selected node; and displaying the selected node and the identified one or more chains of nodes connected to the selected node to visually distinguish from rest of the interconnected nodes in the flow map. Displaying the selected node and the identified one or more chains of nodes connected to the selected node to visually distinguish from rest of the interconnected nodes in the flow map includes: displaying the selected node and the identified one or more chains of nodes connected to the selected node in the foreground and rest of the interconnected nodes in the background. Displaying the selected node and the identified one or more chains of nodes connected to the selected node to visually distinguish from rest of the interconnected nodes in the flow map include: displaying each node in the one or more chains of nodes connected to the selected node to visually fade away from the selected node at a level associated with a hop distance of each node away from the nodes of interest, wherein the level of fading increases with an increase in the hop distance.

In yet another aspect, a non-transitory computer readable medium embodying instructions when executed by a processor to cause operations to be performed for displaying a visual topology of a monitored distributed system is disclosed. The operations performed include: receiving performance data associated with a monitored application performed over a distributed system of interconnected nodes of machines; identifying nodes of interest and one or more chains of nodes connected to the nodes of interest from the interconnected nodes based on the received performance data; generating an interactive flow map of the interconnected nodes in the distributed system; providing a user interface for displaying the interactive flow map; and automatically displaying the interactive flow map through the provided user interface to visually distinguish the identified nodes of interest and the one or more chains of nodes connected to the nodes of interest from rest of the interconnected nodes in the interactive flow map, wherein the one or more chains of nodes connected to the nodes of interest are displayed to visually indicate a hop distance of each node in the one or more chains from the connected nodes of interest.

The non-transitory computer readable medium can be implemented in various ways to include one or more of the following features. For example, displaying the one or more chains of nodes connected to the nodes of interest to visually indicate the hop distance of each node in the one or more chains from the connected nodes of interest can include: displaying each node in the one or more chains to visually fade away from the nodes of interest at a level associated with the hop distance of each node away from the nodes of interest, wherein the level of fading increases with an increase in the hop distance. The hop distance can include a number of hops away from the nodes of interest. Visually distinguishing the identified nodes of interest and the one or more chains of nodes connected to the nodes of interest from rest of the interconnected nodes in the interactive flow map can include: varying a color, a size, a thickness of a line, a level of opaqueness or transparency, or a combination of a visual representation of the identified nodes of interest, the one or more chains of nodes connected to the nodes of interest, and connections between the nodes in the one or more chains of nodes.

Visually distinguishing the identified nodes of interest and the one or more chains of nodes connected to the nodes of interest from rest of the interconnected nodes in the interactive flow map can include: displaying the identified nodes of interest and the one or more chains of nodes connected to the nodes of interest in the foreground and rest of the interconnected nodes in the background. The identified nodes of interest can include nodes identified to have performance issues based on the received performance data. The non-transitory computer readable medium embodying instructions when executed by a processor can cause operations to be performed including receiving user input through the user interface that indicate a selection of one of the interconnected nodes in the flow map; identifying one or more chains of nodes connected to the selected node; and displaying the selected node and the identified one or more chains of nodes connected to the selected node to visually distinguish from rest of the interconnected nodes in the flow map. The one or more modules can be executable to display the selected node and the identified one or more chains of nodes connected to the selected node to visually distinguish from rest of the interconnected nodes in the flow map including: displaying the selected node and the identified one or more chains of nodes connected to the selected node in the foreground and rest of the interconnected nodes in the background. Displaying the selected node and the identified one or more chains of nodes connected to the selected node to visually distinguish from rest of the interconnected nodes in the flow map can include: displaying each node in the one or more chains of nodes connected to the selected node to visually fade away from the selected node at a level associated with a hop distance of each node away from the nodes of interest, wherein the level of fading increases with an increase in the hop distance.

BRIEF DESCRIPTION OF THE DRAWINGS

FIG. 1B is a process flow diagram of another process for displaying a complex service topology for monitoring as disclosed.

FIGS. 1C, 1D, 1E, and 1F are process flow diagrams of additional operations performed for processes illustrated in FIGS. 1A and 1B.

FIG. 3A is a diagram showing an exemplary flow map that illustrates the interactive nature of the flow map including the ability to dynamically select a specific vertex (e.g., a node) on the flow map.

FIG. 7 is a block diagram of an exemplary computing system implementing the disclosed technology.

DETAILED DESCRIPTION

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

To maintain the highest level of service performance and end user experience, each web application can be monitored to provide insight into information that can negatively affect the overall performance of the web application, which can cause negative end user experience. For example, when monitoring a large flow map representing many applications and tiers, a user can be overwhelmed by the large volume of information and unable to gain any insights due to the complexity of the interconnections between different nodes in the monitored environment. It becomes difficult to see and identify where the problems exist in the complex interconnections of nodes on the flow map and how the problems propagate along the connections in the flow map.

Displaying a Complex Service Topology for Monitoring Overview

The technology disclosed in this patent document provides for dynamic and efficient application intelligence platforms, systems, devices, methods, and computer readable media including non-transitory type that embody instructions for causing a machine including a processor to perform various operations disclosed in this patent document to display a complex service topology for monitoring. The disclosed technology provides the display of the complex service topology for monitoring so that a user can easily visually identify the problems (e.g., problem nodes) on a complex flow map of the monitored environment and how the problems propagate along connections to other nodes in the flow map.

Displaying a Complex Service Topology for Monitoring Process

Figure 1A:
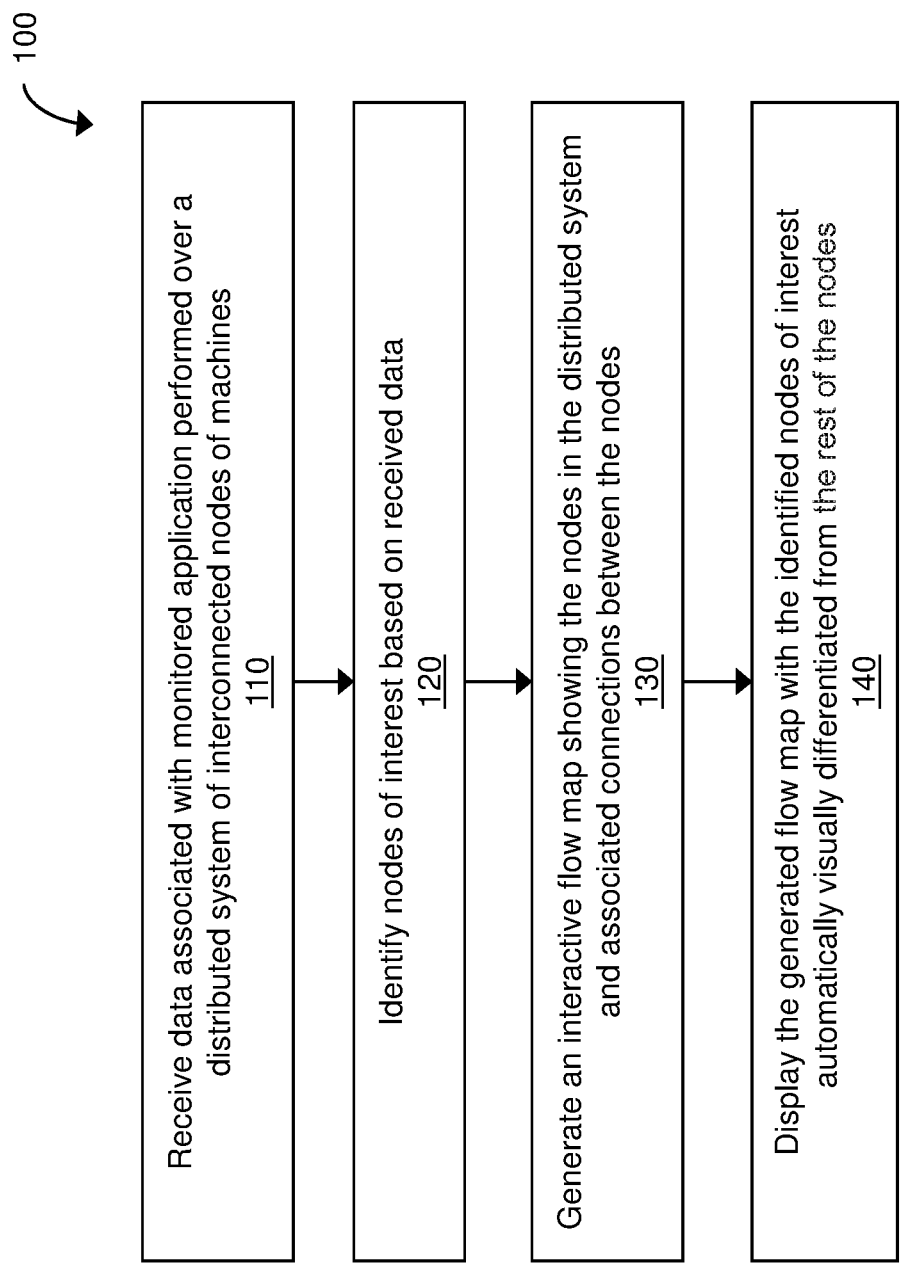
FIG. 1A is a process flow diagram of an exemplary process for displaying a complex service topology for monitoring as disclosed.

FIG. 1A is a process flow diagram of an exemplary process 100 for displaying a complex service topology for monitoring as disclosed. As discussed further below with respect to FIGS. 5-7, performance issues with a monitored environment is detected by monitoring applications and nodes in the monitored environment using agents installed at individual machines in the nodes. Each node can include one or more machines that perform part of the applications. The agents collect data associated with the applications of interest and associated nodes and machines where the applications are being operated. Examples of the collected data include performance data, such as metrics, metadata, and topology data that indicate relationship information. A controller in communication with the agents receive the data collected by the agents (110). The controller analyzes the received data to identify nodes of interest (120). The nodes of interest can be those nodes with performance issues (e.g., compared to a threshold, based on classification algorithm, machine learning, etc.). The controller generates an interactive flow map of the monitored environment with vertices representing tiers and nodes of machines that perform the applications (130). The collected data that includes metadata or topology data can be used to generate the interactive flow map. The interactive flow map also shows the connections (indicating the relationship information) between the vertices to show how the vertices are connected to one another.

Through the user interface, the controller can display the generated flow map with the identified nodes of interest automatically visually differentiated from rest of the nodes in the flow map (140). For example, the nodes of interest can be displayed with a different color than the rest of the normal nodes. All of the nodes of interest having performance issues can be displayed as red nodes and the normal nodes can be displayed as green nodes, for example. Other ways to differentiate the nodes of interest include using highlights, shadings, sizes, etc. By visually differentiating the nodes of interest, potential problems in the monitored nodes and applications can be easily and instantaneous conveyed to a user.

FIG. 1B is a process flow diagram of another process 102 for displaying a complex service topology for monitoring as disclosed. The process 102 is substantially similar to process 100 with operations 110, 120, 130, and 140 being performed in the same manner. Process 102 adds interactive functionality to process 100. For example, process 102 includes receiving a selection of a node in the flow map and displaying the selected node visually different from rest of the nodes (150). The received selection of the node can be a node having performance issues or a normal node. Both types of nodes can be treated in a similar manner.

FIGS. 1C, 1D, 1E, and 1F are process flow diagrams of additional operations performed for processes 100 and 102. For example, FIG. 1C shows that identifying nodes of interest based on received data (120) can include analyzing the received data to determine whether the node has performance anomalies (122). For example, the data can be compared against threshold levels, analyzed using a classification algorithm, or analyzed using machine learning. FIG. 1D shows that displaying the generated interactive flow map (140) can include displaying the nodes of interest using highlights or other visual accentuated manner (142). In addition, other nodes connected to the nodes of interests can be displayed to fade away from the nodes of interested with the connected nodes farther away (by hop distance) from the nodes of interests being faded more than the closer nodes based on the distance from the nodes of interest. The fading can be accomplished by controlling the transparency or the opacity of the displayed nodes connected to the nodes of interest.

FIG. 1E shows that displaying the nodes of interest using highlights or other visually accentuated manner and fading away connected nodes (142) can include visually distinguishing nodes of interest from other nodes (144). As disclosed above, different colors, highlights, sizes, etc. can be used to distinguish the nodes of interest from other nodes that are normal. In addition, these other properties including colors, sizes, highlights, etc. can be used to indicate information on the nodes themselves.

FIG. 1F shows that receiving a selection of a node as a part of the interactive flow map (150) can include displaying the selected node by bringing the selected node to the foreground (e.g., based on the mouse hover) and show all connections to the selected node while all other nodes and their connections are shown in the background (152). In addition, other nodes connected to the nodes of interests can be displayed to fade away from the nodes of interested with the connected nodes farther away (by hop distance) from the nodes of interests being faded more than the closer nodes based on the distance from the nodes of interest. The fading can be accomplished by controlling the transparency or the opacity of the displayed nodes connected to the nodes of interest.

Figure 2A:
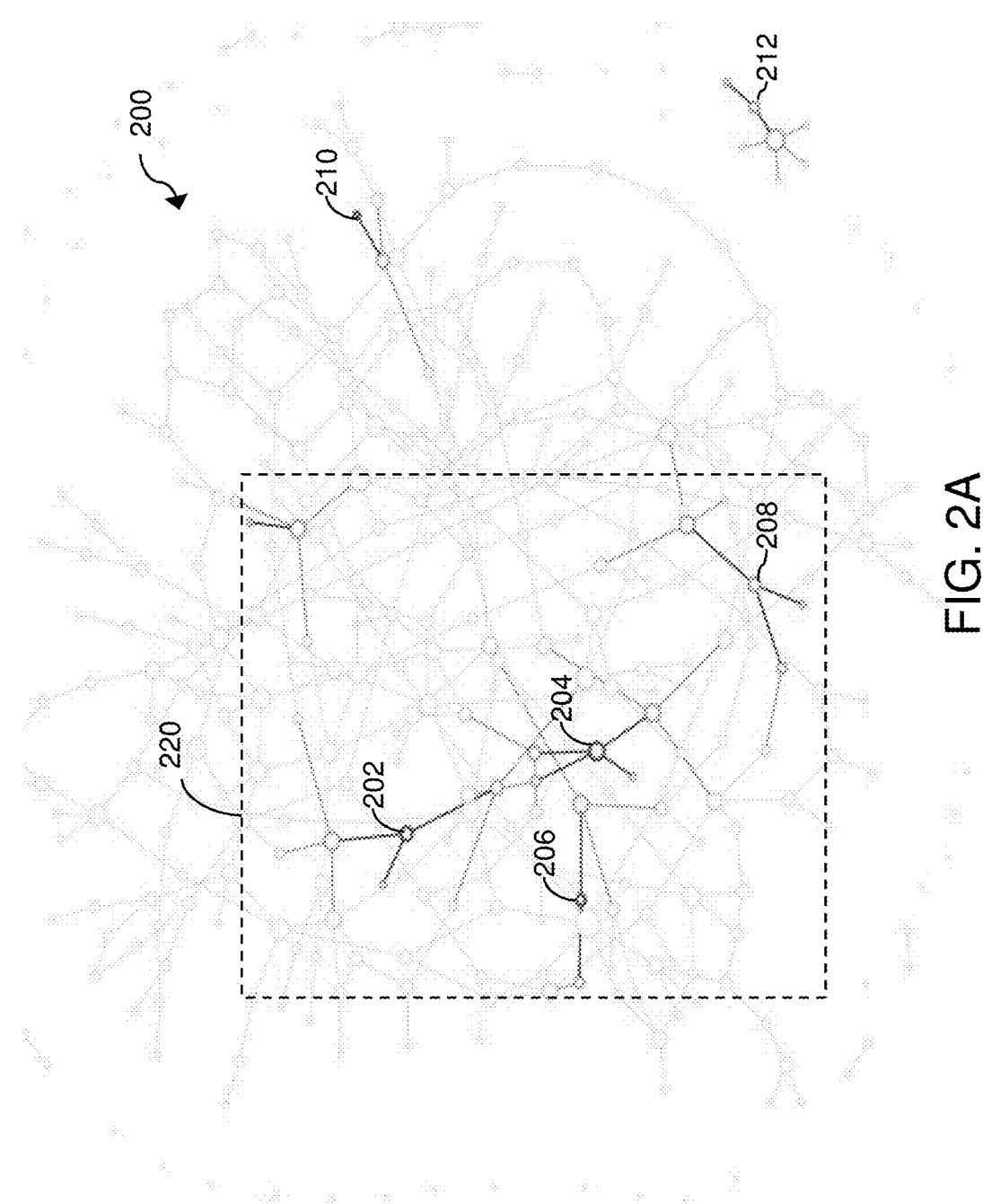
FIG. 2A is a diagram showing a flow map of vertices represented by circles with the connections between vertices represented by solid lines.

FIG. 2A is a diagram showing a flow map 200 of vertices represented by circles with the connections between vertices represented by solid lines. In the flow map 200, the vertices of interest 202, 204, 206, 208, 210, and 212 are automatically displayed to be visually distinguishable from other nodes in the flow map. In the example shown in FIG. 2A, the vertices of interest 202, 204, 206, 208, 210, and 212 can represent nodes experiencing performance issues and are displayed prominently using a color different from other nodes not experience similar performance issues or anomalies. In addition to the nodes of interest 202, 204, 206, 208, 210, and 212, the nodes connected to the vertices of interest 202, 204, 206, 208, 210, and 212 are also displayed prominently and include solid lines that show how those nodes are connected to the nodes of interest 202, 204, 206, 208, 210, and 212. All other vertices or nodes are faded and shown as background to the vertices of interest 202, 204, 206, 208, 210, and 212. To further illustrate the automatic displaying of the vertices or nodes of interest in a prominent manner, FIG. 2B shows a zoomed-in diagram 210 of a portion 220 of the flow map shown in FIG. 2A.

Figures 2B, 2C:
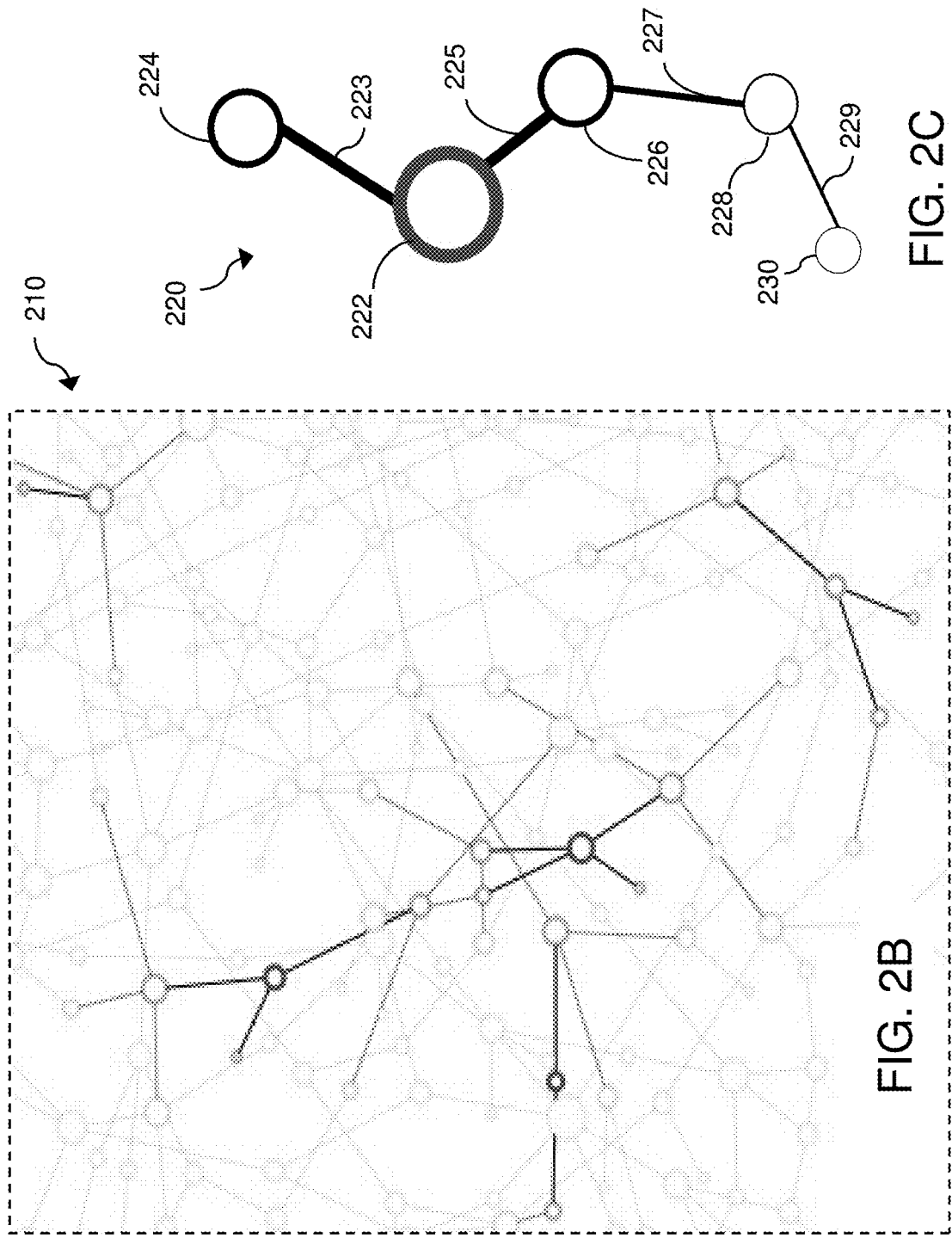
FIG. 2B shows a zoomed-in diagram of a portion of the flow map shown in FIG. 2A.
FIG. 2C shows a diagram of an exemplary flow map showing the fading away feature of connected nodes.

FIG. 2C shows a diagram of an exemplary flow map 220 showing the fading away feature of connected nodes. In the exemplary flow map 220, only the node of interest and its connected nodes are shown without the other nodes in the flow map, which usually are displayed in the background as previously shown in FIGS. 2A and 2B. The other nodes (those not of interest) are removed from FIG. 2C to focus on the fading away visualization feature. In addition, the number of node of interest has been reduced to one node and the connected other nodes reduced to four nodes to further focus the illustration to the fading away visualization feature. Thus, the flow map in FIG. 2C has been oversimplified to provide a clear illustration of the fade-away feature.

As shown in FIG. 2C, a node of interest 222 is displayed to be larger than other nodes connected to the node of interest 222. In addition, the node of interest 222 is displayed using a different color (e.g., red) than the rest of the nodes. In another aspect, the thickness of the circle representing the node of interest 222 is greater than other nodes connected to the node of interest 222. Moreover, the opacity or the transparency of the circle representing the node of interest 222 can be controlled to accentuate the visual appearance of the node of interest 222. For example, the node of interest 222 can be displayed using maximum opacity or minimum transparency. In implementations, any one or a combination of the size, color, thickness, etc. can be used to accentuate and identify the node of interest 222 or to indicate some other information on the node of interest (e.g., load or number of internal components) or the connection (e.g., call latency, distance, type of connection).

Nodes 224 and 225 are one hop away from the node of interest 222 and thus are displayed using the next largest circle, the next thickest circle, the next level of opacity or transparency, or a combination of these to visually indicate that nodes 224 and 226 are connected closest to the node of interest 222. In addition, the connector lines 223 and 225 connecting nodes 224 and 226 respectively to the node of interest 222 can be displayed using the thickest line, or the highest level of opacity or transparency, or a combination of these features. The thickness, size, or the level of opacity or transparency, or a combination of these features of connector lines 223 and 225 can be maximized relative to the other connector lines to visually indicate that the connector lines 223 and 225 connect to nodes 224 and 226 that are closest to (e.g., one hop away from) the node of interest 222. In some implementations, the thickness, size, or the level of opacity or transparency, or a combination of these features of connector lines 223 and 225 can be matched to the thickness, size, or the level of opacity or transparency of the node of interest 222. In some implementations, the thickness, size, or the level of opacity or transparency, or a combination of these features of connector lines 223 and 225 can be matched to the thickness, size, or the level of opacity or transparency of the connected nodes 224 and 226. In yet other implementations, the thickness, size, or the level of opacity or transparency, or a combination of these features of connector lines 223 and 225 can be adjusted to show a tapered fading as the lines 223 and 225 move from the node of interest 222 to the connected nodes 224 and 225 respectively.

Node 228 is two hops away from the node of interest 222 and connected through node 226. Node 228 is displayed using a circle having a size, thickness, or the level of opacity or transparency, or a combination of these features that is at a level below that of nodes 224 and 226 to visually show node 228 to be more faded away than nodes 226 and 224 due to node 228 being further away from the node of interest 222 than nodes 224 and 226 (e.g., two hops vs. one hop away). The connector line 227 connects node 226 to node 228. The thickness, size, the level of opacity or transparency, or a combination of these features of the connector line 227 is at a level below that of the connector lines 225 and 223 to visually show that connector 227 connects to the further away node 228. Similar to other connector lines, the thickness, size, the level of opacity or transparency, or a combination of these features of the connector line 227 can be adjusted to show a tapered fading as the connector 227 moves from node 226 to the connected node 228.

Node 230 is three hops away from the node of interest 222 and connected through nodes 228 and 226. Node 230 is displayed using a circle having a size, thickness, or the level of opacity or transparency, or a combination of these features that is at a level below that of node 228 to visually show node 230 to be more faded away than node 228 due to node 230 being further away from the node of interest 222 than node 228 (e.g., three hops vs. two hops away). The connector line 229 connects node 230 to node 228. The thickness, size, the level of opacity or transparency, or a combination of these features of the connector line 229 is at a level below that of the connector line 227 to visually show that connector 229 connects to the further away node 230. Similar to other connector lines, the thickness, size, the level of opacity or transparency, or a combination of these features of the connector line 229 can be adjusted to show a tapered fading as the connector 229 moves from node 228 to the connected node 230.

Visualization of the vertices or nodes of interest as shown in FIGS. 2A, 2B, and 2C allows a user to quickly identify a chain of problematic vertices, and where they start and end. To enhance the identification of problematic vertices or nodes, additional data can be overlaid such as the names of the vertices. Additional information can be used such as colors and sizes of vertices to indicate load or problem type. Moreover, FIG. 2C has been simplified and generalized to show only the nodes of interest and other nodes connected to the nodes of interest. In actual implementation, all other nodes not connected to the nodes of interest can be displayed but faded away in the background to minimize or reduce the visual appearance of those nodes that are unrelated to the nodes of interest.

FIG. 3A is a diagram showing an exemplary flow map 300 that illustrates the interactive nature of the flow map including the ability to dynamically select a specific vertex (e.g., a node) on the flow map. As illustrated in FIG. 3A, a user can interact with any vertex (e.g., a node) on the flow map by dynamically selecting a vertex (e.g., a node). Any vertex (e.g., a node) can be selected including a node having performance issues or a normal node. The visual indication of the selected node of interest and other nodes connected to the selected node of interest is substantially the same whether the node of interest is experiencing performance issues or performing normally. However, a normal node is visually differentiated from a node having performance issue. For example, different colors can be used to differentiate a normal node (e.g. displayed in green) from a node having performance issues (e.g., displayed in red). Other visual means can be implemented to visually distinguish a normal node from a node having performance issues including using different labels.

A pointer 304 is shown in FIG. 3A to represent a user interacting with a node 302 by selecting the node 302 using a user interface, for example. The selected node (e.g., node 302) is brought into the foreground and allows the user to perform discovery and exploration of the selected node and its connected nodes. The pointer 304 interaction can include a mouse pointer that hovers over the node and in response to the interaction, the hovered over node is visually accentuated and its connected nodes are gradually faded to show the distance of the connected nodes from the hovered over node.

Figure 3B:
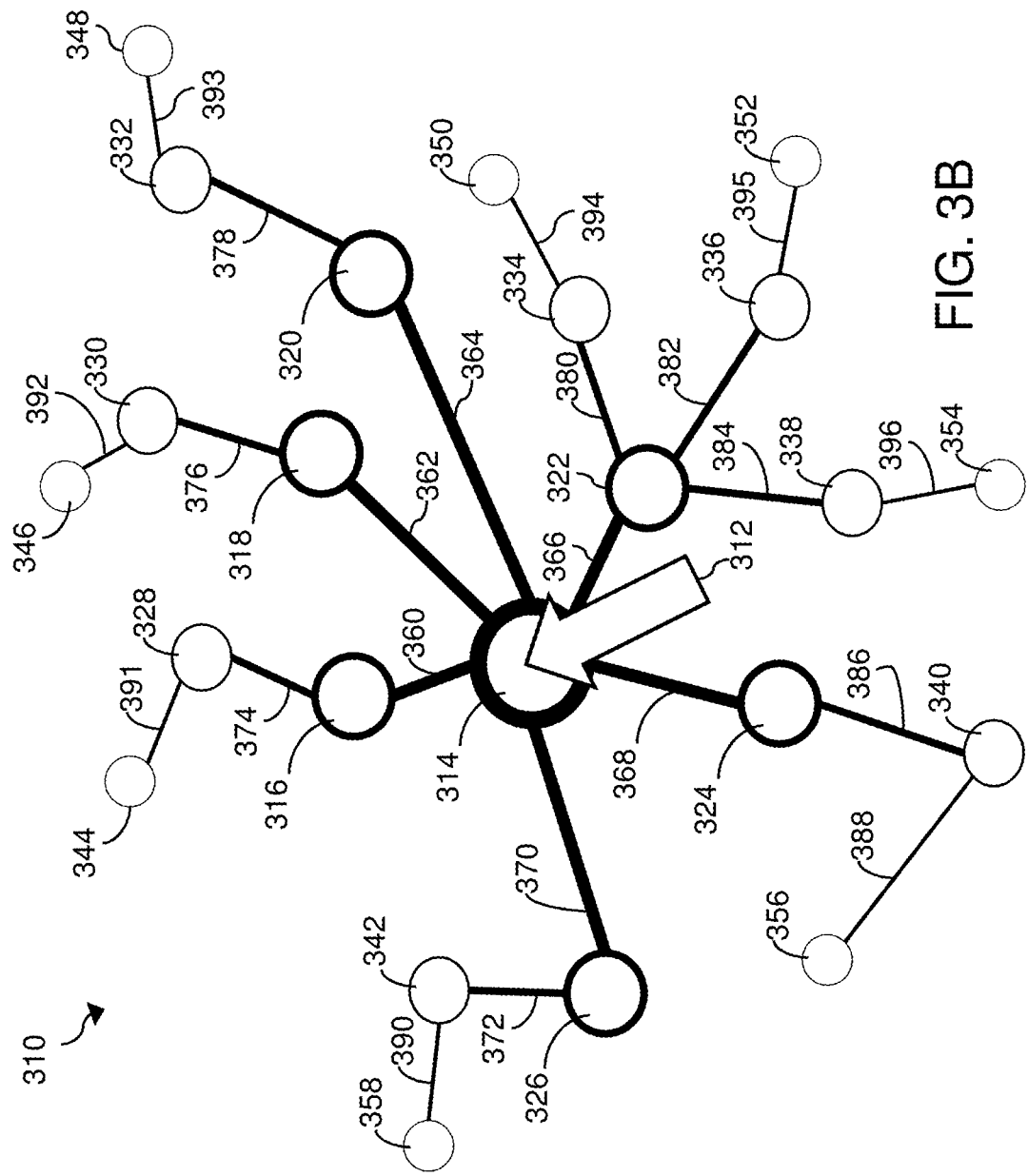
FIG. 3B is a diagram of an exemplary flow map that illustrate the display of the hovered over node and its connected nodes that fade away based on the distance away from the hovered over node.

FIG. 3B is a diagram of an exemplary flow map 310 that illustrate the display of the hovered over node and its connected nodes that fade away based on the distance away from the hovered over node. A pointer (e.g., a mouse pointer) 312 hovers over a node 314, and the hovered over node 314 is accentuated to show the focus on the node 314. Specifically, node 314 is brought to the foreground and displayed using a circle having size, thickness, or the level of opacity or transparency, or a combination of these features to indicate the node 314 as the selected node of interest. In addition, all other nodes connected to selected the node of interest 314 are displayed by fading away each node based on the distance (e.g., hop distance) away from the selected node of interest 314.

For example, nodes 316, 318, 320, 322, 324, and 326 are one hop away from the node of interest 314 and thus are displayed using the next largest circle, the next thickest circle, the next level of opacity or transparency, or a combination of these features to visually indicate that nodes 316, 318, 320, 322, 324, and 326 are connected closest to the node of interest 314. In addition, the connector lines 360, 362, 364, 366, 368, and 370 connecting nodes 316, 318, 320, 322, 324, and 326 respectively to the node of interest 314 can be displayed using the thickest line, or the highest level of opacity or transparency, or both. The thickness, size, or the level of opacity or transparency, or a combination of these features of connector lines 360, 362, 364, 366, 368, and 370 are maximized relative to the other connector lines to visually indicate that the connector lines 360, 362, 364, 366, 368, and 370 connect to nodes 316, 318, 320, 322, 324, and 326 that are closest to (e.g., one hop away from) the node of interest 314. In some implementations, the thickness, size, or the level of opacity or transparency, or a combination of these features of connector lines 360, 362, 364, 366, 368, and 370 can be matched to the thickness, size, or the level of opacity or transparency of the node of interest 314. In some implementations, the thickness, size, or the level of opacity or transparency, or a combination of these features of connector lines 360, 362, 364, 366, 368, and 370 can be matched to the thickness, size, or the level of opacity or transparency of the connected nodes 316, 318, 320, 322, 324, and 326. In yet other implementations, the thickness, size, or the level of opacity or transparency, or a combination of these features of connector lines 360, 362, 364, 366, 368, and 370 can be adjusted to show a tapered or graduated fading as the lines 360, 362, 364, 366, 368, and 370 move from the node of interest 314 to the connected nodes 316, 318, 320, 322, 324, and 326 respectively.

Nodes 328, 330, 332, 334, 336, 338, 340, and 342 are two hops away from the node of interest 314 and connected through nodes 316, 318, 320, 322, 324, and 326 respectively. Nodes 328, 330, 332, 334, 336, 338, 340, and 342 are displayed using a circle having a size, thickness, or the level of opacity or transparency, or a combination of these features that is at a level below that of nodes 316, 318, 320, 322, 324, and 326 to visually show nodes 328, 330, 332, 334, 336, 338, 340, and 342 to be more faded away than nodes 316, 318, 320, 322, 324, and 326 due to nodes 328, 330, 332, 334, 336, 338, 340, and 342 being further away from the node of interest 314 than nodes 316, 318, 320, 322, 324, and 326 (e.g., two hops vs. one hop away). The connector lines 374, 376, 378, 380, 382, 384, 386, and 372 connect nodes 328, 330, 332, 334, 336, 338, 340, and 342 to nodes 316, 318, 320, 322, 324, and 326. The thickness, size, the level of opacity or transparency, or a combination of these features of the connector lines 374, 376, 378, 380, 382, 384, 386, and 372 is at a level below that of the connector lines 360, 362, 364, 366, 368, and 370 to visually show that connector lines 374, 376, 378, 380, 382, 384, 386, and 372 connect to the further away nodes 328, 330, 332, 334, 336, 338, 340, and 342. Similar to other connector lines, the thickness, size, the level of opacity or transparency, or a combination of these features of the connector lines 374, 376, 378, 380, 382, 384, 386, and 372 can be adjusted to show a tapered fading as the connectors 374, 376, 378, 380, 382, 384, 386, and 372 move from nodes 316, 318, 320, 322, 324, and 326 to the connected nodes 328, 330, 332, 334, 336, 338, 340, and 342.

Nodes 344, 346, 348, 350, 353, 354, 356, and 358 are three hops away from the node of interest 314 and connected to the node of interest 314 through nodes 328, 330, 332, 334, 336, 338, 340, and 342 and then through 316, 318, 320, 322, 324, and 326. Nodes 344, 346, 348, 350, 353, 354, 356, and 358 are displayed using a circle having a size, thickness, or the level of opacity or transparency, or a combination of these features that is at a level below that of nodes 328, 330, 332, 334, 336, 338, 340, and 342 to visually show nodes 344, 346, 348, 350, 353, 354, 356, and 358 to be more faded away than nodes 328, 330, 332, 334, 336, 338, 340, and 342 due to nodes 344, 346, 348, 350, 353, 354, 356, and 358 being further away from the node of interest 314 than nodes 328, 330, 332, 334, 336, 338, 340, and 342 (e.g., three hops vs. two hops away). The connector lines 391, 392, 393, 394, 395, 396, 388, and 390 connect nodes 344, 346, 348, 350, 353, 354, 356, and 358 to nodes 328, 330, 332, 334, 336, 338, 340, and 342. The thickness, size, the level of opacity or transparency, or a combination of these features of the connector lines 391, 392, 393, 394, 395, 396, 388, and 390 is at a level below that of the connector lines 374, 376, 378, 380, 382, 384, 386, and 372 to visually show that connector lines 391, 392, 393, 394, 395, 396, 388, and 390 connect to the further away nodes 344, 346, 348, 350, 353, 354, 356, and 358. Similar to other connector lines, the thickness, size, the level of opacity or transparency, or a combination of these features of the connector lines 391, 392, 393, 394, 395, 396, 388, and 390 can be adjusted to show a tapered fading as the connector lines 391, 392, 393, 394, 395, 396, 388, and 390 move away from nodes 328, 330, 332, 334, 336, 338, 340, and 342 to the connected nodes 344, 346, 348, 350, 353, 354, 356, and 358.

FIG. 3B has been simplified and generalized to show only the nodes of interest and other nodes connected to the nodes of interest. In actual implementation, all other nodes not connected to the nodes of interest can be displayed but faded away in the background to minimize or reduce the visual appearance of those nodes that are unrelated to the nodes of interest.

Figure 4:
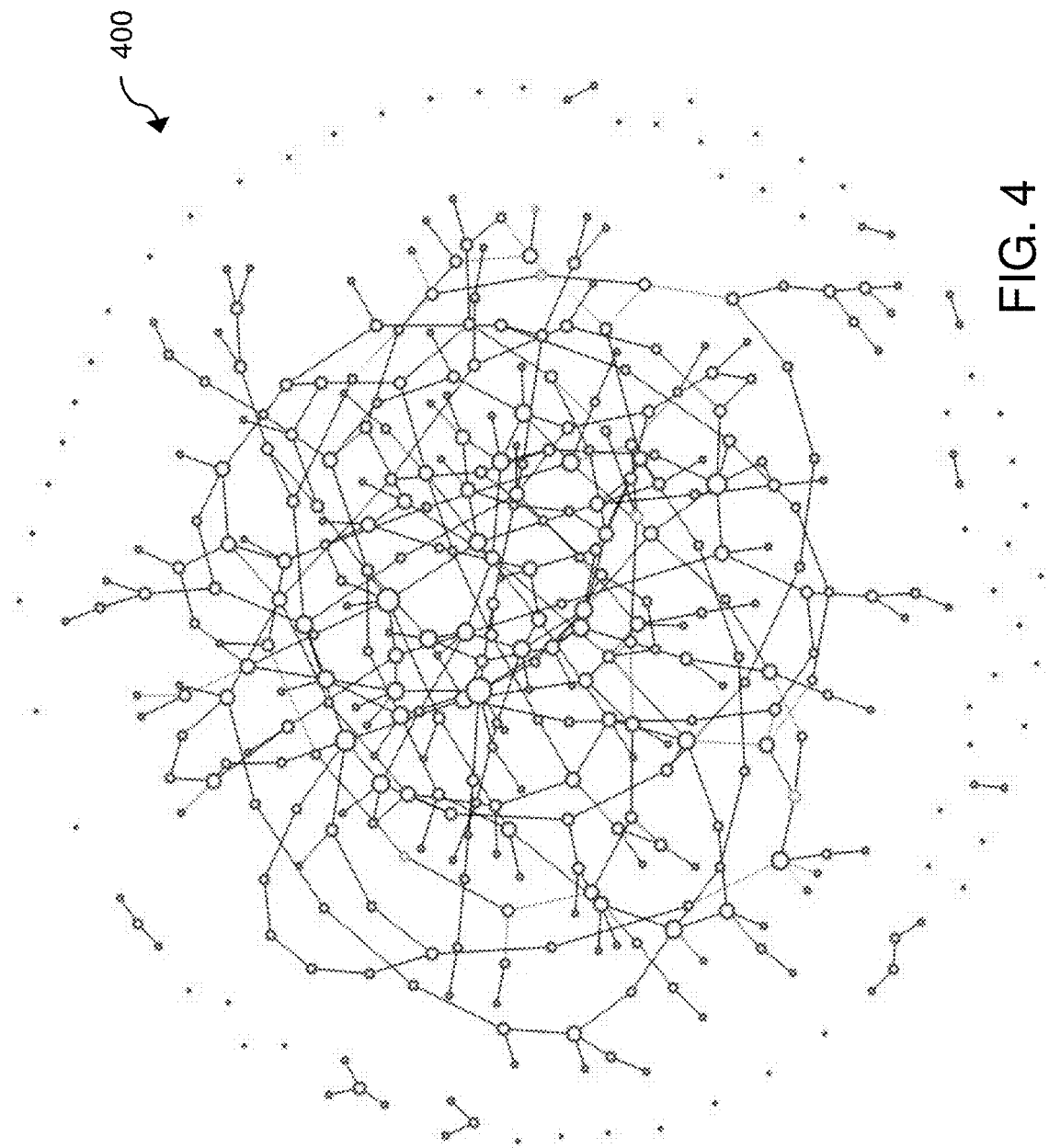
FIG. 4 is a diagram showing an exemplary flow map that illustrate a complex web of vertices without the use of the disclosed technique for displaying the vertices of interest.

FIG. 4 is a diagram showing an exemplary flow map 400 that illustrate a complex web of vertices without the use of the disclosed technique for displaying the vertices of interest. Because all vertices and connector lines are displayed with no distinguishing features, it becomes very difficult to visually focus on only those vertices of interest.

Application Intelligence Platform Architecture

Figure 5:
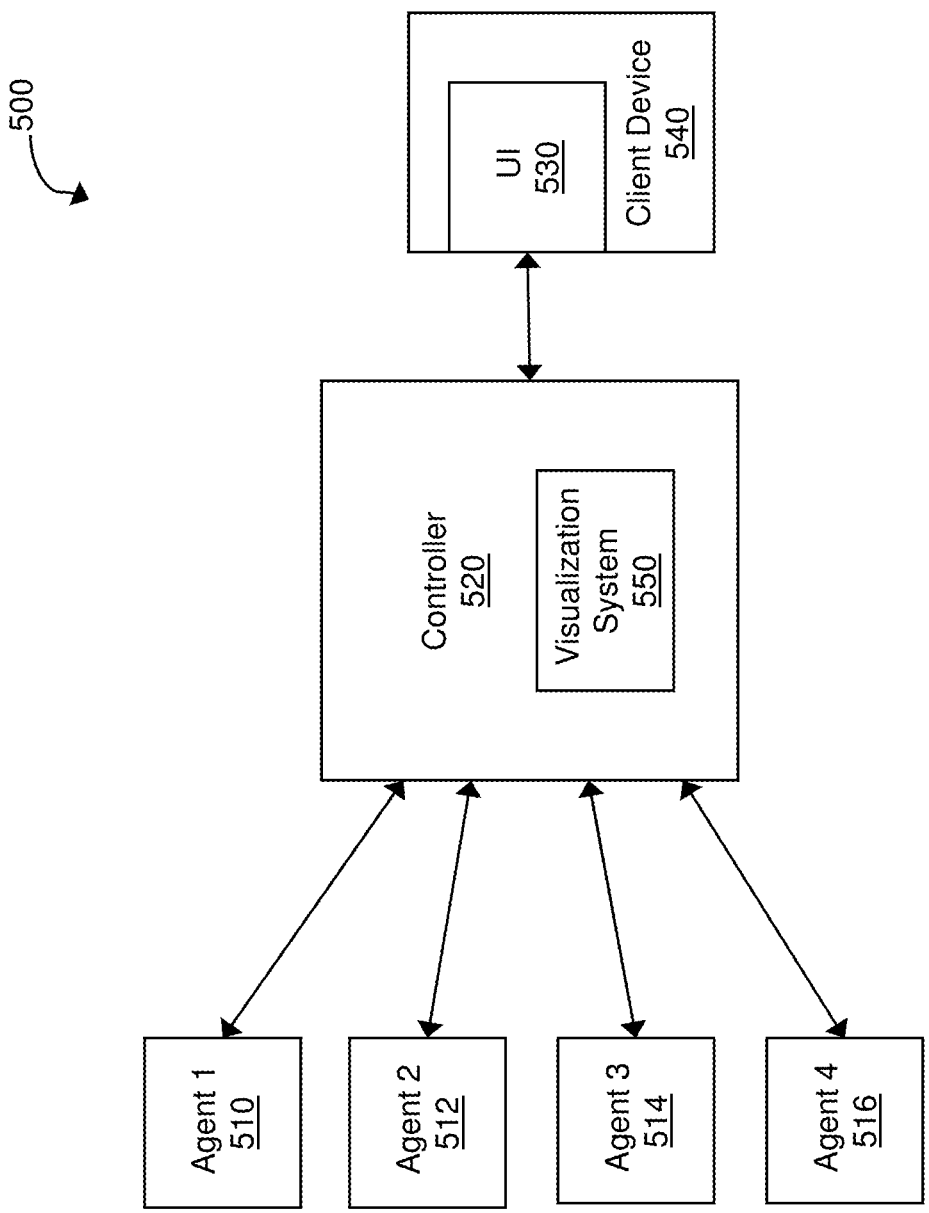
FIG. 5 is a block diagram of an exemplary application intelligence platform that can provide the displaying of a complex service topology for monitoring as disclosed in this patent document.

FIG. 5 is a block diagram of an exemplary application intelligence platform 500 that can implement the displaying of the complex service topology for monitoring as disclosed in this patent document. The application intelligence platform is a system that monitors and collect metrics of performance data for an application environment being monitored. At the simplest structure, the application intelligence platform includes one or more agents 510, 512, 514, 516 and one or more controllers 520. While FIG. 5 shows four agents communicatively linked to a single controller, the total number of agents and controller can vary based on a number of factors including the number of applications monitored, how distributed the application environment is, the level of monitoring desired, the level of user experience desired, etc.

Controllers and Agents

The controller 520 is the central processing and administration server for the application intelligence platform. The controller 520 serves a browser-based user interface (UI) 530 that is the primary interface for monitoring, analyzing, and troubleshooting the monitored environment. The controller 520 can control and manage monitoring of business transactions distributed over application servers. Specifically, the controller 520 can receive runtime data from agents 510, 512, 514, 516 and coordinators, associate portions of business transaction data, communicate with agents to configure collection of runtime data, and provide performance data and reporting through the interface 530. The interface 530 may be viewed as a web-based interface viewable by a client device 540. In some implementations, a client device 540 can directly communicate with controller 520 to view an interface for monitoring data.

In the Software as a Service (SaaS) implementation, a controller instance 520 is hosted remotely by a provider of the application intelligence platform 500. In the on-premise (On-Prem) implementation, a controller instance 520 is installed locally and self-administered.

The controllers 520 receive data from different agents 510, 512, 514, 516 deployed to monitor applications, databases and database servers, servers, and end user clients for the monitored environment. Any of the agents 510, 512, 514, 516 can be implemented as different types of agents specific monitoring duties. For example, application agents are installed on each server that hosts applications to be monitored. Instrumenting an agent adds an application agent into the runtime process of the application.

Database agents are software (e.g., Java program) installed on a machine that has network access to the monitored databases and the controller. Database agents queries the databases monitored to collect metrics and passes the metrics for display in the metric browser—database monitoring and in the databases pages of the controller UI. Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents are standalone programs (e.g., standalone Java program) that collect hardware-related performance statistics from the servers in the monitored environment. The standalone machine agents can be deployed on machines that host application servers, database servers, messaging servers, Web servers, etc. A standalone machine agent has an extensible architecture.

End user monitoring (EUM) is performed using browser agents and mobile agents to provide performance information from the point of view of the client, such as a web browser or a mobile native application. Browser agents and mobile agents are unlike other monitoring through application agents, database agents, and standalone machine agents that being on the server. Through EUM, web use (e.g., by real users or synthetic agents), mobile use, or any combination can be monitored depending on the monitoring needs.

Browser agents are small files using web-based technologies, such as JavaScript agents injected into each instrumented web page, as close to the top as possible, as the web page is served and collects data. Once the web page has completed loading, the collected data is bundled into a beacon and sent to the EUM cloud for processing and ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent is a small piece of highly performant code that gets added to the source of the mobile application. Mobile RUM provides information on the native iOS or Android mobile application as the end users actually use the mobile application. Mobile RUM provides visibility into the functioning of the mobile application itself and the mobile application's interaction with the network used and any server-side applications the mobile application communicates with.

The controller 520 can include a visualization system 550 for provide the displaying of the complex service topology for monitoring as disclosed in this patent document. In some implementations, the visualization system 550 can be implemented in a separate machine (e.g., a server) different from the one hosting the controller 520.

Application Intelligence Monitoring

The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling

Entities in the application environment (such as the JBoss service, MQSeries modules, and databases) and the services provided by the entities (such as a login transaction, service or product search, or purchase transaction) are mapped to an application intelligence model. In the application intelligence model, a business transaction represents a particular service provided by the monitored environment. For example, in an e-commerce application, particular real-world services can include user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions

A business transaction representation of the particular service provided by the monitored environment provides a view on performance data in the context of the various tiers that participate in processing a particular request. A business transaction represents the end-to-end processing path used to fulfill a service request in the monitored environment. Thus, a business environment is a type of user-initiated action in the monitored environment defined by an entry point and a processing path across application servers, databases, and potentially many other infrastructure components. Each instance of a business transaction is an execution of that transaction in response to a particular user request. A business transaction can be created by detecting incoming requests at an entry point and tracking the activity associated with request at the originating tier and across distributed components in the application environment. A flow map can be generated for a business transaction that shows the touch points for the business transaction in the application environment.

Performance monitoring can be oriented by business transaction to focus on the performance of the services in the application environment from the perspective of end users. Performance monitoring based on business transaction can provide information on whether a service is available (e.g., users can log in, check out, or view their data), response times for users, and the cause of problems when the problems occur.

Business Applications

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

Nodes

A node in the application intelligence model corresponds to a monitored server or JVM in the application environment. A node is the smallest unit of the modeled environment. In general, a node corresponds to an individual application server, JVM, or CLR on which a monitoring Agent is installed. Each node identifies itself in the application intelligence model. The Agent installed at the node is configured to specify the name of the node, tier and business application under which the Agent reports data to the Controller.

Tiers

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

Backend System

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance information is available for the backend call. For detailed transaction analysis for the leg of a transaction processed by the backend, the database, web service, or other application need to be instrumented.

Baselines and Thresholds

The application intelligence platform uses both self--learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for your system by detecting slow, very slow, and stalled transactions. Configurable thresholds provide a flexible way to associate the right business context with a slow request to isolate the root cause.

Health Rules, Policies, and Actions

In addition, health rules can be set up with conditions that use the dynamically generated baselines to trigger alerts or initiate other types of remedial actions when performance problems are occurring or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. This health rule can define a warning condition as the combination of an average response time greater than the default baseline by 2 standard deviations and a load greater than 100 calls per minute. The health rule that tests whether the business transaction error rate is much higher than normal can define a critical condition as the combination of an error rate greater than the default baseline by 3 standard deviations and an error rate greater than 10 errors per minute and a load greater than 50 calls per minute. This health rule can define a warning condition as the combination of an error rate greater than the default baseline by 2 standard deviations and an error rate greater than 5 errors per minute and a load greater than 50 calls per minute.

Policies can be configured to trigger actions when a health rule is violated or when any event occurs. Triggered actions can include notifications, diagnostic actions, auto-scaling capacity, running remediation scripts.

Metrics

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots

Snapshots provide a detailed picture of a given application at a certain point in time. Snapshots usually include call graphs that allow that enables drilling down to the line of code that may be causing performance problems. The most common snapshots are transaction snapshots.

Exemplary Implementation of Application Intelligence Platform

Figure 6:
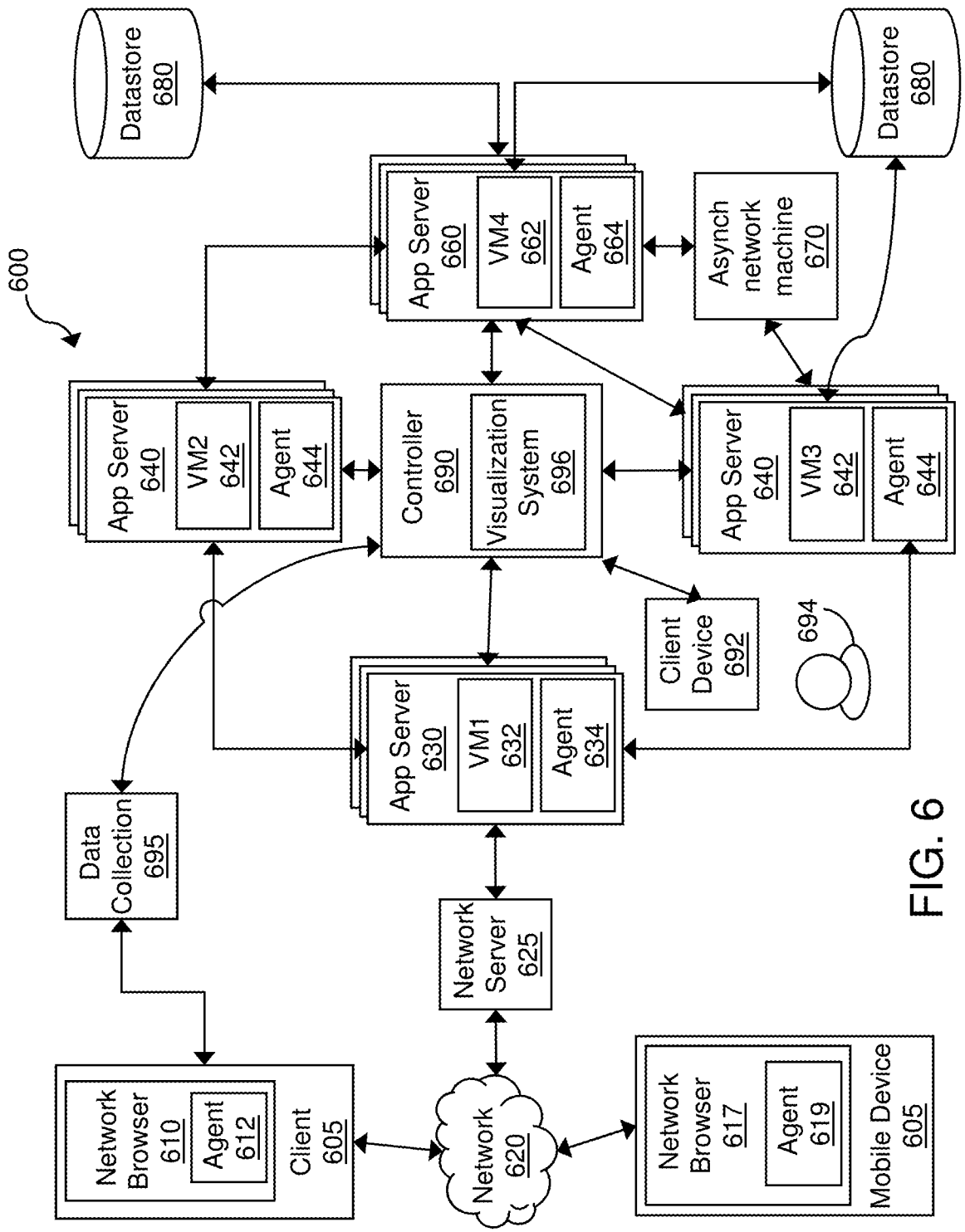
FIG. 6 is a block diagram of an exemplary system for providing the displaying of a complex service topology for monitoring as disclosed in this patent document, including the processes disclosed with respect to FIGS. 1A-1F.

FIG. 6 is a block diagram of an exemplary system 600 for providing displaying of complex service topology as disclosed in this patent document, including the processes disclosed with respect to FIGS. 1-14. The system 600 in FIG. 6 includes client device 605 and 692, mobile device 615, network 620, network server 625, application servers 630, 640, 650 and 660, asynchronous network machine 670, data stores 680 and 685, controller 690, and data collection server 695. The controller 690 can include visualization system 696 for providing displaying of complex service topology for monitoring as disclosed in this patent document. In some implementations, the visualization system 696 can be implemented in a separate machine (e.g., a server) different from the one hosting the controller 690.

Client device 605 may include network browser 610 and be implemented as a computing device, such as for example a laptop, desktop, workstation, or some other computing device. Network browser 610 may be a client application for viewing content provided by an application server, such as application server 630 via network server 625 over network 620.

Network browser 610 may include agent 612. Agent 612 may be installed on network browser 610 and/or client 605 as a network browser add-on, downloading the application to the server, or in some other manner. Agent 612 may be executed to monitor network browser 610, the operating system of client 605, and any other application, API, or other component of client 605. Agent 612 may determine network browser navigation timing metrics, access browser cookies, monitor code, and transmit data to data collection 660, controller 690, or another device. Agent 612 may perform other operations related to monitoring a request or a network at client 605 as discussed herein.

Mobile device 615 is connected to network 620 and may be implemented as a portable device suitable for sending and receiving content over a network, such as for example a mobile phone, smart phone, tablet computer, or other portable device. Both client device 605 and mobile device 615 may include hardware and/or software configured to access a web service provided by network server 625.

Mobile device 615 may include network browser 617 and an agent 619. Mobile device may also include client applications and other code that may be monitored by agent 619. Agent 619 may reside in and/or communicate with network browser 617, as well as communicate with other applications, an operating system, APIs and other hardware and software on mobile device 615. Agent 619 may have similar functionality as that described herein for agent 612 on client 605, and may repot data to data collection server 660 and/or controller 690.

Network 620 may facilitate communication of data among different servers, devices and machines of system 600 (some connections shown with lines to network 620, some not shown). The network may be implemented as a private network, public network, intranet, the Internet, a cellular network, Wi-Fi network, VoIP network, or a combination of one or more of these networks. The network 620 may include one or more machines such as load balance machines and other machines.

Network server 625 is connected to network 620 and may receive and process requests received over network 620. Network server 625 may be implemented as one or more servers implementing a network service, and may be implemented on the same machine as application server 630 or one or more separate machines. When network 620 is the Internet, network server 625 may be implemented as a web server.

Application server 630 communicates with network server 625, application servers 640 and 650, and controller 690. Application server 650 may also communicate with other machines and devices (not illustrated in FIG. 6). Application server 630 may host an application or portions of a distributed application. The host application 632 may be in one of many platforms, such as including a Java, PHP, .Net, and Node.JS, be implemented as a Java virtual machine, or include some other host type. Application server 630 may also include one or more agents 634 (i.e. "modules"), including a language agent, machine agent, and network agent, and other software modules. Application server 630 may be implemented as one server or multiple servers as illustrated in FIG. 6.

Application 632 and other software on application server 630 may be instrumented using byte code insertion, or byte code instrumentation (BCI), to modify the object code of the application or other software. The instrumented object code may include code used to detect calls received by application 632, calls sent by application 632, and communicate with agent 634 during execution of the application. BCI may also be used to monitor one or more sockets of the application and/or application server in order to monitor the socket and capture packets coming over the socket.

In some embodiments, server 630 may include applications and/or code other than a virtual machine. For example, servers 630, 640, 650, and 660 may each include Java code, .Net code, PHP code, Ruby code, C code, C++ or other binary code to implement applications and process requests received from a remote source. References to a virtual machine with respect to an application server are intended to be for exemplary purposes only.

Agents 634 on application server 630 may be installed, downloaded, embedded, or otherwise provided on application server 630. For example, agents 634 may be provided in server 630 by instrumentation of object code, downloading the agents to the server, or in some other manner. Agent 634 may be executed to monitor application server 630, monitor code running in a virtual machine 632 (or other program language, such as a PHP, .Net, or C program), machine resources, network layer data, and communicate with byte instrumented code on application server 630 and one or more applications on application server 630.

Each of agents 634, 644, 654 and 664 may include one or more agents, such as language agents, machine agents, and network agents. A language agent may be a type of agent that is suitable to run on a particular host. Examples of language agents include a JAVA agent, .Net agent, PHP agent, and other agents. The machine agent may collect data from a particular machine on which it is installed. A network agent may capture network information, such as data collected from a socket.

Agent 634 may detect operations such as receiving calls and sending requests by application server 630, resource usage, and incoming packets. Agent 634 may receive data, process the data, for example by aggregating data into metrics, and transmit the data and/or metrics to controller 690. Agent 634 may perform other operations related to monitoring applications and application server 630 as discussed herein. For example, agent 634 may identify other applications, share business transaction data, aggregate detected runtime data, and other operations.

An agent may operate to monitor a node, tier or nodes or other entity. A node may be a software program or a hardware component (e.g., memory, processor, and so on). A tier of nodes may include a plurality of nodes which may process a similar business transaction, may be located on the same server, may be associated with each other in some other way, or may not be associated with each other.

A language agent may be an agent suitable to instrument or modify, collect data from, and reside on a host. The host may be a Java, PHP, .Net, Node.JS, or other type of platform. Language agent may collect flow data as well as data associated with the execution of a particular application. The language agent may instrument the lowest level of the application to gather the flow data. The flow data may indicate which tier is communicating with which tier and on which port. In some instances, the flow data collected from the language agent includes a source IP, a source port, a destination IP, and a destination port. The language agent may report the application data and call chain data to a controller. The language agent may report the collected flow data associated with a particular application to a network agent.

A network agent may be a standalone agent that resides on the host and collects network flow group data. The network flow group data may include a source IP, destination port, destination IP, and protocol information for network flow received by an application on which network agent is installed. The network agent may collect data by intercepting and performing packet capture on packets coming in from a one or more sockets. The network agent may receive flow data from a language agent that is associated with applications to be monitored. For flows in the flow group data that match flow data provided by the language agent, the network agent rolls up the flow data to determine metrics such as TCP throughput, TCP loss, latency and bandwidth.

The network agent may then report the metrics, flow group data, and call chain data to a controller. The network agent may also make system calls at an application server to determine system information, such as for example a host status check, a network status check, socket status, and other information.

A machine agent may reside on the host and collect information regarding the machine which implements the host. A machine agent may collect and generate metrics from information such as processor usage, memory usage, and other hardware information.

Each of the language agent, network agent, and machine agent may report data to the controller. Controller 690 may be implemented as a remote server that communicates with agents located on one or more servers or machines. The controller may receive metrics, call chain data and other data, correlate the received data as part of a distributed transaction, and report the correlated data in the context of a distributed application implemented by one or more monitored applications and occurring over one or more monitored networks. The controller may provide reports, one or more user interfaces, and other information for a user.

Agent 634 may create a request identifier for a request received by server 630 (for example, a request received by a client 605 or 615 associated with a user or another source). The request identifier may be sent to client 605 or mobile device 615, whichever device sent the request. In embodiments, the request identifier may be created when a data is collected and analyzed for a particular business transaction.

Each of application servers 640, 650 and 660 may include an application and agents. Each application may run on the corresponding application server. Each of applications 642, 652 and 662 on application servers 640-660 may operate similarly to application 632 and perform at least a portion of a distributed business transaction. Agents 644, 654 and 664 may monitor applications 642-662, collect and process data at runtime, and communicate with controller 690. The applications 632, 642, 652 and 662 may communicate with each other as part of performing a distributed transaction. In particular, each application may call any application or method of another virtual machine.

Asynchronous network machine 670 may engage in asynchronous communications with one or more application servers, such as application server 650 and 660. For example, application server 650 may transmit several calls or messages to an asynchronous network machine. Rather than communicate back to application server 650, the asynchronous network machine may process the messages and eventually provide a response, such as a processed message, to application server 660. Because there is no return message from the asynchronous network machine to application server 650, the communications among them are asynchronous.

Data stores 680 and 685 may each be accessed by application servers such as application server 650. Data store 685 may also be accessed by application server 650. Each of data stores 680 and 685 may store data, process data, and return queries received from an application server. Each of data stores 680 and 685 may or may not include an agent.

Controller 690 may control and manage monitoring of business transactions distributed over application servers 630-660. In some embodiments, controller 690 may receive application data, including data associated with monitoring client requests at client 605 and mobile device 615, from data collection server 660. In some embodiments, controller 690 may receive application monitoring data and network data from each of agents 612, 619, 634, 644 and 654. Controller 690 may associate portions of business transaction data, communicate with agents to configure collection of data, and provide performance data and reporting through an interface. The interface may be viewed as a web-based interface viewable by client device 692, which may be a mobile device, client device, or any other platform for viewing an interface provided by controller 690. In some embodiments, a client device 692 may directly communicate with controller 690 to view an interface for monitoring data.

Client device 692 may include any computing device, including a mobile device or a client computer such as a desktop, work station or other computing device. Client computer 692 may communicate with controller 690 to create and view a custom interface. In some embodiments, controller 690 provides an interface for creating and viewing the custom interface as a content page, e.g., a web page, which may be provided to and rendered through a network browser application on client device 692.

Applications 632, 642, 652 and 662 may be any of several types of applications. Examples of applications that may implement applications 632-662 include a Java, PHP, .Net, Node.JS, and other applications.

FIG. 7 is a block diagram of a computer system 2200 for implementing the present technology. System 700 of FIG. 7 may be implemented in the contexts of the likes of clients 605, 692, network server 625, servers 630, 640, 650, 660, a synchronous network machine 670 and controller 690.

The computing system 700 of FIG. 7 includes one or more processors 710 and memory 720. Main memory 720 stores, in part, instructions and data for execution by processor 710. Main memory 710 can store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. However, the components may be connected through one or more data transport means. For example, processor unit 710 and main memory 720 may be connected via a local microprocessor bus, and the mass storage device 730, peripheral device(s) 780, portable or remote storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 620.

Portable storage device 740 operates in conjunction with a portable non-volatile storage medium, such as a compact disk, digital video disk, magnetic disk, flash storage, etc. to input and output data and code to and from the computer system 700 of FIG. 7. The system software for implementing embodiments of the present invention may be stored on such a portable medium and input to the computer system 700 via the portable storage device 740.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 700 of FIG. 7 may include one or more antennas, radios, and other circuitry for communicating over wireless signals, such as for example communication using Wi-Fi, cellular, or other wireless signals.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A system for displaying a visual topology of a monitored distributed computer network, including:
   a processor;
   a memory; and
   one or more modules stored in the memory and executable by a processor to perform operations including:
      receive data associated with a monitored application performed over a distributed computer network of interconnected nodes of devices;
      identify nodes of interest and one or more chains of nodes connected to the nodes of interest from the interconnected nodes based on the received data, wherein the nodes of interest are devices in the distributed computer network performing operationally below a certain threshold;
      generate an interactive flow map of the interconnected nodes in the distributed computer network;
      provide a user interface for displaying the interactive flow map; and
      automatically display the interactive flow map through the provided user interface to visually distinguish the identified nodes of interest and the one or more chains of nodes connected to the nodes of interest from the rest of the interconnected nodes in the interactive flow map, wherein the one or more chains of nodes connected to the nodes of interest are displayed to visually indicate a hop distance of each node in the one or more chains from the connected nodes of interest and to visually detect the nodes of interest with performance below the certain threshold propagating along the chains of nodes in the distributed computer network.

2. The system of claim 1, wherein the one or more modules are executable to display the one or more chains of nodes connected to the nodes of interest to visually indicate the hop distance of each node in the one or more chains from the connected nodes of interest including:
   display each node in the one or more chains to visually fade away from the nodes of interest at a level associated with the hop distance of each node away from the nodes of interest, wherein the level of fading increases with an increase in the hop distance.

3. The system of claim 1, wherein the hop distance includes a number of hops away from the nodes of interest.

4. The system of claim 1, wherein the one or more modules are executable to visually distinguish the identified nodes of interest and the one or more chains of nodes connected to the nodes of interest from rest of the interconnected nodes in the interactive flow map including:
   vary a color, a size, a thickness of a line, a level of opaqueness or transparency, or a combination of a visual representation of the identified nodes of interest, the one or more chains of nodes connected to the nodes of interest, and connections between the nodes in the one or more chains of nodes.

5. The system of claim 1, wherein the one or more modules are executable to visually distinguish the identified nodes of interest and the one or more chains of nodes connected to the nodes of interest from rest of the interconnected nodes in the interactive flow map including:
   display the identified nodes of interest and the one or more chains of nodes connected to the nodes of interest in the foreground and rest of the interconnected nodes in the background.

6. The system of claim 1, wherein the one or more modules are executable to receive user input through the user interface that indicate a selection of one of the interconnected nodes in the flow map;
   identify one or more chains of nodes connected to the selected node; and
   display the selected node and the identified one or more chains of nodes connected to the selected node to visually distinguish from rest of the interconnected nodes in the flow map.

7. The system of claim 1, wherein the one or more modules are executable to display the selected node and the identified one or more chains of nodes connected to the selected node to visually distinguish from rest of the interconnected nodes in the flow map including:

display the selected node and the identified one or more chains of nodes connected to the selected node in the foreground and rest of the interconnected nodes in the background.

8. The system of claim 1, wherein the one or more modules are executable to display the selected node and the identified one or more chains of nodes connected to the selected node to visually distinguish from rest of the interconnected nodes in the flow map including:
display each node in the one or more chains of nodes connected to the selected node to visually fade away from the selected node at a level associated with a hop distance of each node away from the nodes of interest, wherein the level of fading increases with an increase in the hop distance.

9. The system of claim 1, wherein the received data includes performance data associated with the monitored application or topology data indicating relationship information regarding the interconnected nodes.

10. The system of claim 1, wherein the one or more modules are executable to visually distinguish the identified nodes of interest, the one or more chains of nodes connected to the nodes of interest, and connectors linking the identified nodes of interest to the one or more chains of nodes from rest of the interconnected nodes in the interactive flow map.

11. A method for displaying a visual topology of a monitored distributed computer network, the method including:
receiving data associated with a monitored application performed over a distributed computer network of interconnected nodes of devices;
identifying nodes of interest operating in the distributed computer network and one or more chains of nodes connected to the nodes of interest from the interconnected nodes based on the received data, wherein the nodes of interest are devices in the distributed computer network performing operationally below a certain threshold;
generating an interactive flow map of the interconnected nodes in the distributed computer network;
providing a user interface for displaying the interactive flow map; and
automatically displaying the interactive flow map through the provided user interface to visually distinguish the identified nodes of interest and the one or more chains of nodes connected to the nodes of interest from the rest of the interconnected nodes in the interactive flow map, wherein the one or more chains of nodes connected to the nodes of interest are displayed to visually indicate a hop distance of each node in the one or more chains from the connected nodes of interest and to visually detect the nodes of interest with performance below the certain threshold propagating along the chains of nodes in the distributed computer network.

12. The method of claim 11, wherein displaying the one or more chains of nodes connected to the nodes of interest to visually indicate the hop distance of each node in the one or more chains from the connected nodes of interest includes:
displaying each node in the one or more chains to visually fade away from the nodes of interest at a level associated with the hop distance of each node away from the nodes of interest, wherein the level of fading increases with an increase in the hop distance.

13. The method of claim 11, wherein the hop distance includes a number of hops away from the nodes of interest.

14. The method of claim 11, wherein visually distinguishing the identified nodes of interest and the one or more chains of nodes connected to the nodes of interest from rest of the interconnected nodes in the interactive flow map includes:
varying a color, a size, a thickness of a line, a level of opaqueness or transparency, or a combination of a visual representation of the identified nodes of interest, the one or more chains of nodes connected to the nodes of interest, and connections between the nodes in the one or more chains of nodes.

15. The method of claim 11, wherein visually distinguishing the identified nodes of interest and the one or more chains of nodes connected to the nodes of interest from rest of the interconnected nodes in the interactive flow map includes:
displaying the identified nodes of interest and the one or more chains of nodes connected to the nodes of interest in the foreground and rest of the interconnected nodes in the background.

16. The method of claim 11, including:
receiving user input through the user interface that indicate a selection of one of the interconnected nodes in the flow map;
identifying one or more chains of nodes connected to the selected node; and
displaying the selected node and the identified one or more chains of nodes connected to the selected node to visually distinguish from rest of the interconnected nodes in the flow map.

17. The method of claim 16, wherein displaying the selected node and the identified one or more chains of nodes connected to the selected node to visually distinguish from rest of the interconnected nodes in the flow map includes:
displaying the selected node and the identified one or more chains of nodes connected to the selected node in the foreground and rest of the interconnected nodes in the background.

18. The method of claim 16, wherein displaying the selected node and the identified one or more chains of nodes connected to the selected node to visually distinguish from rest of the interconnected nodes in the flow map includes:
displaying each node in the one or more chains of nodes connected to the selected node to visually fade away from the selected node at a level associated with a hop distance of each node away from the nodes of interest, wherein the level of fading increases with an increase in the hop distance.

19. The method of claim 11, wherein the received data includes performance data associated with the monitored application or topology data indicating relationship information regarding the interconnected nodes.

20. The method of claim 11, including visually distinguishing the identified nodes of interest, the one or more chains of nodes connected to the nodes of interest, and connectors linking the identified nodes of interest to the one or more chains of nodes from rest of the interconnected nodes in the interactive flow map.

21. A non-transitory computer readable medium embodying instructions when executed by a processor to cause operations to be performed for displaying a visual topology of a monitored distributed computer network, the operations including:
receiving data associated with a monitored application performed over a distributed computer network of interconnected nodes of devices;

identifying nodes of interest operating in the distributed computer network and one or more chains of nodes connected to the nodes of interest from the interconnected nodes based on the received data, wherein the nodes of interest are devices in the distributed computer network performing operationally below a certain threshold;

generating an interactive flow map of the interconnected nodes in the distributed computer network; providing a user interface for displaying the interactive flow map; and automatically displaying the interactive flow map through the provided user interface to visually distinguish the identified nodes of interest and the one or more chains of nodes connected to the nodes of interest from the rest of the interconnected nodes in the interactive flow map, wherein the one or more chains of nodes connected to the nodes of interest are displayed to visually indicate a hop distance of each node in the one or more chains from the connected nodes of interest and to visually detect the nodes of interest with performance below the certain threshold propagating along the chains of nodes in the distributed computer network.

22. The non-transitory computer readable medium of claim 21, wherein displaying the one or more chains of nodes connected to the nodes of interest to visually indicate the hop distance of each node in the one or more chains from the connected nodes of interest include:

displaying each node in the one or more chains to visually fade away from the nodes of interest at a level associated with the hop distance of each node away from the nodes of interest, wherein the level of fading increases with an increase in the hop distance.

* * * * *